United States Patent [19]

Barger

[11] 4,266,110
[45] May 5, 1981

[54] CLAD WELDING ON AN INCLINED SURFACE

[75] Inventor: John J. Barger, Ringgold, Ga.

[73] Assignee: Combustion Engineering, Inc., Windsor, Conn.

[21] Appl. No.: 968,936

[22] Filed: Dec. 13, 1978

[51] Int. Cl.³ .............................................. B23K 9/04
[52] U.S. Cl. ................................ 219/73.21; 219/76.14
[58] Field of Search ................ 219/73.1, 73.11, 73.21, 219/76.14, 76.12, 73.2; 228/19, 22, 23

[56] References Cited

U.S. PATENT DOCUMENTS

| | | | |
|---|---|---|---|
| 2,191,469 | 2/1940 | Hopkins | 219/76.14 X |
| 3,271,554 | 9/1966 | Johnson | 219/76.14 X |
| 4,005,306 | 1/1977 | Overby | 219/73.21 |

FOREIGN PATENT DOCUMENTS 494233  1/1974  U.S.S.R. ................................ 219/76.14

Primary Examiner—E. A. Goldberg
Attorney, Agent, or Firm—Edward L. Kochey, Jr.

[57] ABSTRACT

Submerged arc strip cladding of the workpiece is carried out on a workpiece which has a surface inclined to the horizontal transverse to the direction of the welding progress. The flux burden is skewed in a zone overlaying the molten metal area with a heavier burden being located on the downhill side of the weld than on the uphill side.

4 Claims, 9 Drawing Figures

CLAD WELDING ON AN INCLINED SURFACE

BACKGROUND OF THE INVENTION

The invention relates to weld cladding of metallic workpieces and in particular to the cladding of the workpiece having a surface inclined in a direction transverse to the direction of weld travel.

It is known to plate or clad various metallic workpieces by depositing weld metal by submerged arc electric welding. Multiple rod or strip electrodes are used for the purpose of achieving a reasonable width of surface coverage on a single pass. A typical application of such a cladding method would be to clad the interior surface of a cylindrical pressure vessel with a corrosion resistant alloy such as stainless steel. On occasion there is a sloped internal surface where the thickness of the wall plate changes, for instance where the straight portion of the pressure vessel ends and a hemispherical head begins. Such an inclined surface would be at approximately 10° with the axis of the vessel and run for a length of six to eight inches.

While the vessel may be placed in a horizontal position and rotated on rolls for the purpose of strip cladding, the massive size of many vessels makes it difficult to change the orientation of the axis so that the inclined surface can be placed in a horizontal position. Accordingly, there is a need for clad welding an inclined surface.

It is required that the inside surface after cladding be smooth for purposes of ultrasonically testing the structure. This requires grinding in many cases, and any uneven weld deposit increases not only the cost of the material being deposited but the cost of removal of the excess. In prior art methods there were considerable problems with the weld metal running down the slope. Accordingly, each weld bead laid down was limited in width and, in fact, has a substantial overlap of the previously deposited bead. This required substantial grinding of all of the overlap material.

Furthermore, the overlap portion would have a different composition than the portion which was deposited on the base metal. The dilution of the weld deposit by the base metal would occur only where it was deposited directly on the base metal with such dilution being absent in the overlap portion.

Since the molten metal has a high resistance to electric current flow, there tended to be a burn through to the base metal in the shallow end of the weld metal with resultant undercutting of the base metal. Irregular beads formed which could not be controlled.

SUMMARY OF THE INVENTION

In a submerged arc cladding process carried out on an inclined surface uniform deposition of the weld metal is achieved by skewing the flux burden over the molten metal area. The flux burden being heavier on the downhill side of the weld exerts a force greater than the lesser burden on the uphill side so as to maintain the liquid metal within an area essentially parallel to the surface being plated. This may be accomplished by locating the flux chutes on the downhill side of the weld so that the natural flow of the flux forms this varying flux burden or it may be accomplished by baffling the deposited flux to obtain the desired variation in flux burden.

It is an object of the invention to clad an inclined surface without arc burn through on an uphill side and with the resultant clad being essentially parallel to the surface being clad, and without excessive overlaps between the deposited layers.

DESCRIPTION OF THE PREFERRED EMBODIMENT

U.S. Pat. No. 4,027,135 issued to John Barger illustrates an apparatus and method for submerged arc strip cladding of metallic workpieces. It includes a flux breaker and electromagnetic poles located adjacent the molten flux area which are pulsated to agitate the pool of flux. Such members are efficacious when used with the present invention.

A workpiece 10 has a surface inclined at 10° from the horizontal. Feed roll 12 moves the strip electrode 14 downwardly while electric current is supplied to the electrode through contact tip 16.

Figure 2:
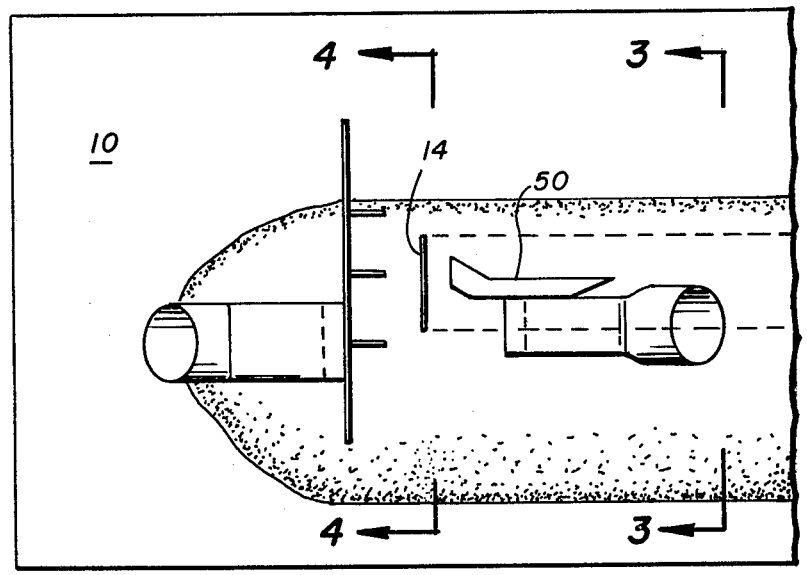
FIG. 2 is a plan view showing both flux guides.
Figure 1:
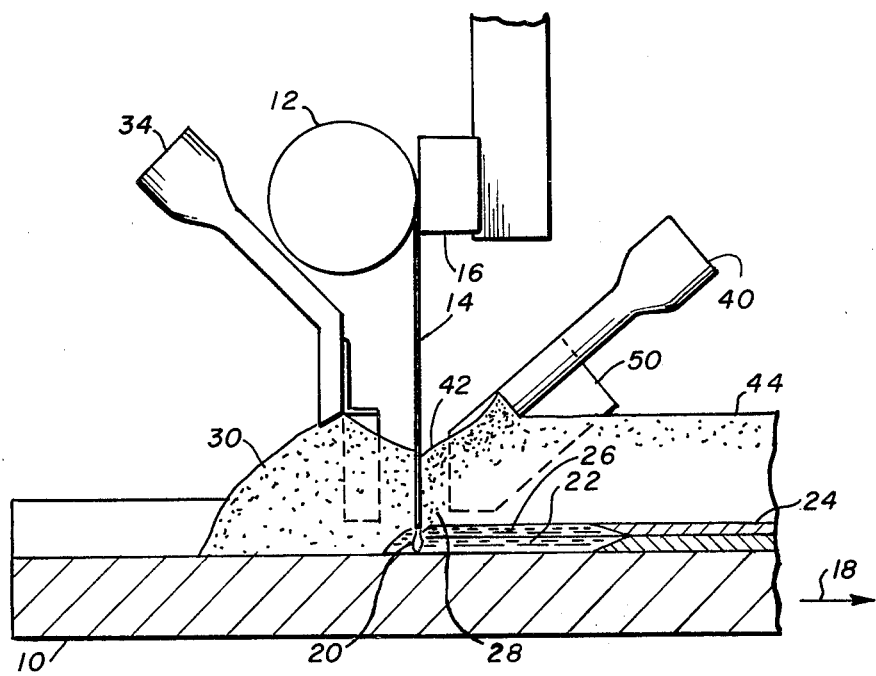
FIG. 1 is a side view illustrating the location of the two flux guides with respect to the welding electrode in a longitudinal direction.

The workpiece 10 is translated to the right in FIG. 1 as indicated by arrow 18 with respect to the electrode 14. The left side of this figure illustrates the leading side of the welding head or strip feeder with the right-hand side illustrating the trailing side.

An arc 20 is struck between the electrode 14 and the workpiece 10 whereby the electrode is melted and deposited in the form of a molten pool 22. This forms a molten metal zone 22 since the deposited weld metal solidifies by location 24. The molten zone is overlaid by a volume of molten flux 26 and unmelted flux 28. A zone of unmelted flux 30 also exists on the leading side for the purpose of submerging the arc.

Figure 3:
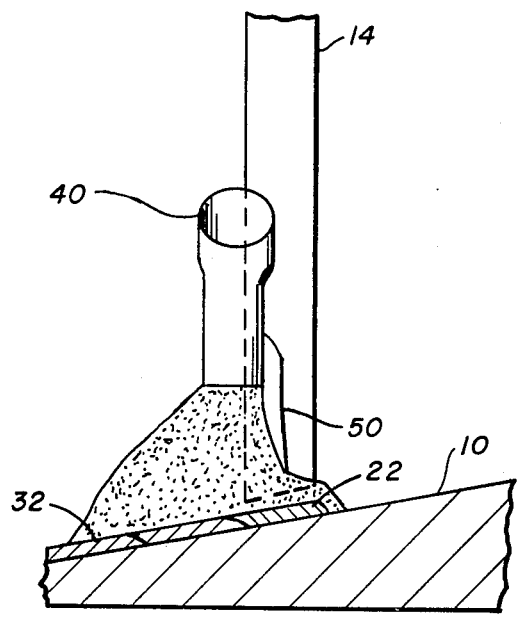
FIG. 3 is an end view showing only the trailing flux guide.

Referring to FIG. 3, the previously deposited weld metal 32 is on the downhill side of the newly deposited weld metal 22.

Figure 4:
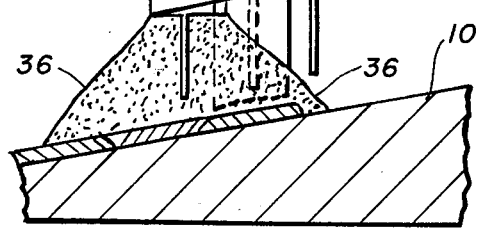
FIG. 4 is a sectional elevation illustrating only the leading flux guide.

As best seen in FIGS. 1 and 4 the leading flux guide 34 deposits by natural flow a volume of flux 30 to the workpiece. The centerline of this flux guide is located on the downhill side of the centerline of the electrode 14. The natural angle of repose of the flux causes the flux to pour outwardly with edges 36 in a direction transverse to the motion. The height and location of the flux guide are located such that the arc at the uphill side of the workpiece 10 is submerged in the flux. While a portion of this flux is consumed by the electrode 14, a significant pile of the flux remains on the downhill side of the workpiece to support later added flux or to naturally cascade into a similar pile after it passes the electrode. It can be seen that this already establishes an unequal flux burden with a greater and heavier burden of flux on the downhill side of the deposited weld metal as compared to the uphill side.

A trailing flux guide 40 is located on the trailing side of the electrode with the flux surface cascading forward as indicated by surface 42 with the volume 44 being carried with the workpiece away to a point of removal.

The flux guide 40 is also located downhill of the centerline of the electrode 14 with the natural angle of repose of the deposited flux again forming an increased burden on the downhill side of the deposited weld metal over the molten zone.

Modification of the imbalance of flux burden, to an extent experimentally determined, is accomplished by the baffle plow 50. With respect to the already deposited flux which is being carried along with the workpiece this plow urges the flux in a downhill direction thereby effecting a modification of the flux burden imbalance. The flux at this time is flowing downwardly from the shoot toward the electrode and simultaneously being carried away from the electrode with the workpiece.

This imbalanced flux load produces a greater static force on the downhill portion of the molten flux and molten metal. It accordingly produces a lower static pressure on the uphill portion. The appropriate amount of skewing required is a function of the relative density of the molten metal and the deposited flux. Since the flux is lighter than the molten metal, skewing significantly greater than the slope of the workpiece is required in this opposite direction.

Figure 5:
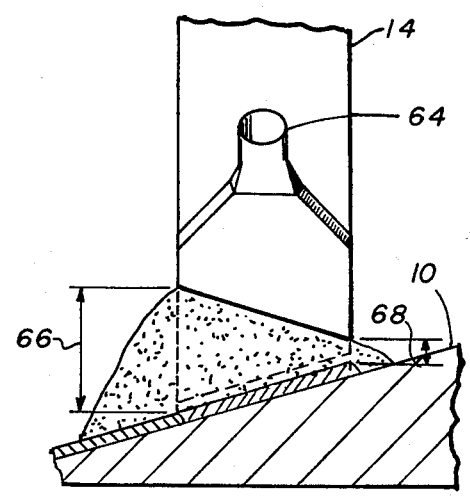
FIG. 5 shows an alternate arrangement of the trailing flux guide.

An alternate method of achieving the skewed distribution of flux is illustrated in FIG. 5. The trailing flux shoot 64 has an opening at the lower end with this opening being located a distance 66 from the workpiece 10 which is significantly greater than the distance 68 at the uphill end. While the difference in elevation at these two locations cannot exceed the angle of repose, an imbalance in the flux loading is established at the flux guide from which the flux cascades forwardly to achieve a related flux imbalance.

The particular dimensions and shape of the baffle must be selected and modified in accordance with the variables experienced including the density of the deposited weld metal and the density of the flux. Also the angle of the slope of the inclined surface and speed of welding will be factors.

Figure 6:
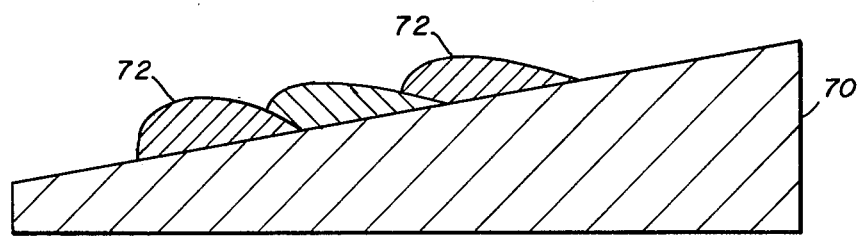
FIG. 6 shows a sectional view of a deposited weld metal according to prior art methods.

The results of experimental operation are indicated on FIGS. 6 through 9. The workpiece 70 was set up with a 10° angle in a direction transverse to the direction of clad travel. It was clad by a series of stringer beads 72 starting at the lower side of the material. A strip 1" wide by 0.025" thick was used to deposit a clad of Type 304 stainless material. FIG. 6 indicates the result using conventional prior art methods including a uniform flux burden.

Figure 7:
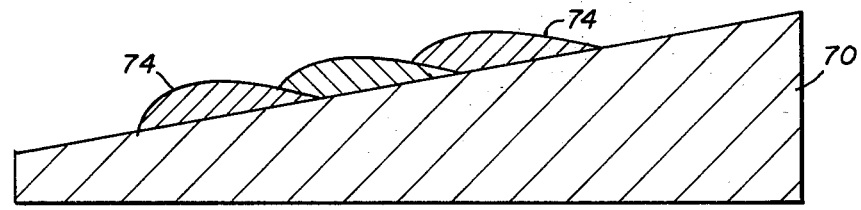
FIG. 7 illustrates a sectional view of the cladding according to the prior art methods using the electromagnets described in U.S. Pat. No. 4,027,135.

FIG. 7 illustrates the form of beads 74 obtained using the method of this U.S. Pat. No. 4,027,135 but with a uniform flux burden. The isolation of the molten flux in accordance with the teachings of that patent operate to widen the deposited bead but the shingling remains.

Figure 8:
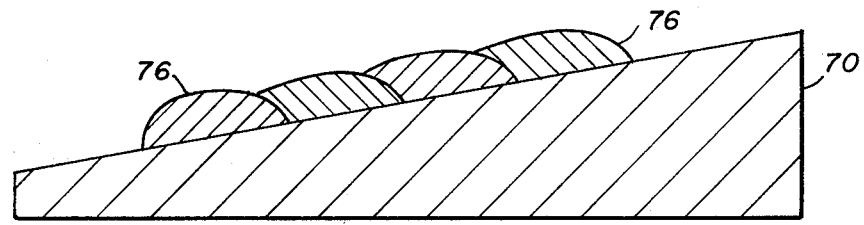
FIG. 8 is a sectional view showing the results of the cladding operation using the skewed flux burden but without electromagnets.
Figure 9:
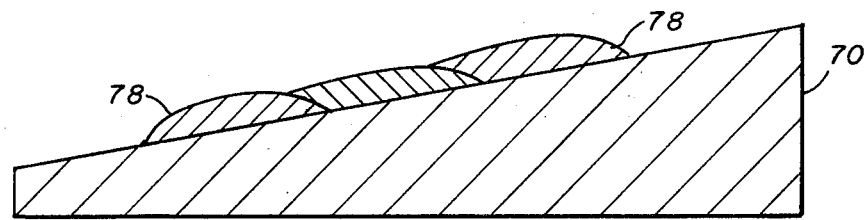
FIG. 9 illustrates the result using both the skewed flux burden and the electromagnets.

FIG. 8 illustrates the form of beads 76 deposited using a skewed flux burden in accordance with the present invention but without the use of the electromagnets. FIG. 9 illustrates the form of beads 78 obtained using the skewed flux burden of the current invention as well as the pulsating electromagnets. In carrying out this experiment the cladding flux was fed to the welding arc zone in a controlled manner to cause a pressure difference across the width of the weld deposit. This was accomplished by flux chutes to divert the flux from the top side of the deposit to the lower, leaving only a minimum burden to protect the arc at the upper side. The welding conditions were 550 amps, 28 volts direct current reverse polarity, and 10" per minute travel. Welding was carried out with a 1" pitch and a 3/16" clad thickness was deposited.

What is claimed is:

1. An apparatus for clad welding on a workpiece having a surface inclined to the horizontal transverse to the direction of welding progress, by depositing a weld layer having a width greater than the depth, comprising: an electrode; means for moving the electrode and the workpiece relative to one another; means for creating an electric arc between the electrode and the workpiece to deposit weld metal, whereby a zone of molten metal is formed on the trailing side of said electrode; a first means for depositing flux at the leading side of said electrode; a second means for depositing flux at the trailing side of said electrode; and a baffle located on the trailing side of said electrode, sufficiently close to said electrode so as to be over the zone of molten metal during operation, said baffle shaped to urge flux traveling on said workpiece over the uphill side of the weld deposit, in a downhill direction, whereby a heavier burden is placed on the downhill side of the zone of molten metal.

2. An apparatus as in claim 1: wherein the centerline of said first means is located downhill of the centerline of said electrode.

3. An apparatus as in claim 1 or 2: wherein the centerline of said second means is located downhill of the centerline of said electrode.

4. A method of submerged arc cladding of the workpiece having a surface inclined with respect to the horizontal in a direction transverse to the welding direction comprising: moving an electrode and the workpiece relative to each other; striking an arc between said electrode and workpiece, and depositing weld metal on said workpiece, whereby a zone of molten weld deposit is formed on the downstream side of the welding location; depositing flux in a manner to cover the welding arc and also the molten weld deposit; and skewing the flux burden over the zone of molten weld metal with a heavier flux burden on the downhill side of the zone than on the uphill side of the zone.

* * * * *